United States Patent [19]

Okubo et al.

[11] Patent Number: 4,553,388
[45] Date of Patent: Nov. 19, 1985

[54] EXHAUST GAS PURIFICATION APPARATUS FOR AN INTERNAL COMBUSTION ENGINE

[75] Inventors: Akira Okubo, Tokyo; Seishi Miura, Shiki, both of Japan

[73] Assignee: Honda Giken Kogyo Kabushiki Kaisha, Tokyo, Japan

[21] Appl. No.: 445,514

[22] Filed: Nov. 30, 1982

[30] Foreign Application Priority Data

| Nov. 30, 1981 | [JP] | Japan | 56-176614[U] |
| Dec. 8, 1981 | [JP] | Japan | 56-196236 |
| Dec. 17, 1981 | [JP] | Japan | 56-202475 |
| Dec. 17, 1981 | [JP] | Japan | 56-202480 |

[51] Int. Cl.⁴ ............................................. F01N 3/22
[52] U.S. Cl. .................................. 60/276; 60/290; 60/293
[58] Field of Search ................ 60/276, 289, 290, 293

[56] References Cited

U.S. PATENT DOCUMENTS

| 3,751,915 | 8/1973 | Ranft | 60/293 |
| 3,869,858 | 3/1975 | Goto | 60/290 |
| 4,169,440 | 10/1979 | Taplin | 60/276 |
| 4,211,074 | 7/1980 | Hattori | 60/289 |
| 4,250,706 | 2/1981 | Mitsuda | 60/289 |
| 4,385,491 | 5/1983 | Sakurai | 60/289 |

Primary Examiner—Douglas Hart
Attorney, Agent, or Firm—Armstrong, Nikaido, Marmelstein & Kubovcik

[57] ABSTRACT

An exhaust gas purification apparatus in an internal combustion engine comprising a control device for biasing the air-fuel ratio of the exhaust gas toward the rich side or the lean side from the theoretical perfect air-fuel ratio in accordance with an operating condition of the engine. The control device can include a control valve controlled to open and close according to the output signal of an exhaust gas sensor interposed in a secondary air introducing passage connected to the exhaust passage of the engine upstream of the catalyzer. The control device can also include a device for causing a delay in opening or a delay in closing of the control valve in accordance with the operating condition of the engine.

15 Claims, 10 Drawing Figures

EXHAUST GAS PURIFICATION APPARATUS FOR AN INTERNAL COMBUSTION ENGINE

BACKGROUND OF THE INVENTION

This invention relates to an exhaust gas purification apparatus in an internal combustion engine chiefly for a vehicle such as a motorized two-wheeled vehicle or the like.

Figure 10:
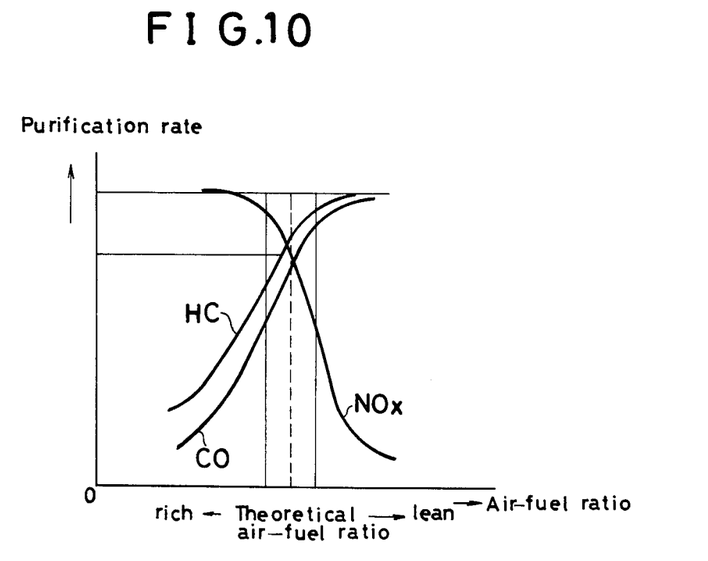
FIG. 10 is a diagram of the characteristics of the exhaust gas components.

As for an apparatus of this kind, one has been known wherein an exhaust passage of an engine is provided with a catalyzer for three components of the exhaust gas, an exhaust gas sensor such as an $O_2$ sensor or the like, and a secondary air introducing opening so that the exhaust gas to be fed to the catalyzer may have air added to it to have a predetermined air-fuel ratio. This is generally performed by introducing the secondary air through the introducing opening in accordance with an output signal of the sensor. It has been usual in the type of apparatus that the air-fuel ratio of the exhaust gas is controlled to be near a theoretical air-fuel ratio, but this is not always preferrable. Namely, the purification characteristics of the catalyzer are usually as shown in FIG. 10. In other words, a total purification rate of CO, HC, $NO_X$ becomes a maximum at the theoretical air-fuel ratio, but the maximum purification rate of each of the three components lies on the rich side or the lean side thereof. More in detail, the maximum purification rate is on the rich side in respect of $NO_X$, while the same is on the lean side in respect of HC and CO. Therefore, it is not always preferrable that the exhaust gas is so controlled as to be near the theoretical air-fuel ratio. In other words, it is usual that the composition ratio of the three components in the exhaust gas is varied with changes in the operating condition of the engine. It often happens that, for instance, generation of CO, and HC is increased by engine operation under low load and low-speed range and generation of $NO_X$ is increased by engine operation under high load and high-speed range. Consequently, the exhaust gas output is not always in compliance with the varied condition in an apparatus where the exhaust gas is always controlled to be near the theoretical air-fuel ratio.

OBJECTS AND SUMMARY OF THE INVENTION

It is an object of the present invention to provide an apparatus which is responsive to an engine operating condition to vary the air-fuel ratio in the exhaust system of the engine to maximize purification of the exhaust gas.

It is a further object of the present invention to accomplish the above main object in a simple apparatus.

It is still a further object of the present invention to provide an exhaust gas purification apparatus which is compact and simply fittable on a two-wheeled motorized vehicle.

These and other objects are attained in an exhaust gas purification apparatus comprising a control means for changing the air-fuel ratio of the exhaust gas towards the rich side or the lean side from the theoretical perfect air-fuel ratio in accordance with an operating condition of the engine. The apparatus is installed in an internal combustion engine having an exhaust passage with a catalyzer for three components of the exhaust gas therein. The exhaust passage also has an exhaust gas sensor located upstream of the catalyzer and a secondary air introducing opening upstream of the sensor so that the exhaust gas which is fed to the catalyzer may be controlled to have a pre-determined air-fuel ratio by introducing secondary air through the opening in accordance with the output signal of the sensor.

The control means can include a control valve arranged to be controlled to open and close according to the output signal of the sensor interposed in the secondary air introducing passage and means for causing a delay in opening or a delay in closing of the control valve in accordance with the operating condition of the engine.

The overall apparatus can further comprise an atmospheric pressure passage and a negative pressure passage. The control valve can include a pressure chamber and an electro-magnetic valve means having inlet means connected to the atmospheric pressure passage and the negative pressure passage and outlet means connected to the pressure chamber. The electro-magnetic valve means is responsive to the output signal of the sensor. The means for causing a delay can include a first orifice in the atmospheric pressure passage, a second orifice in the negative pressure passage, and means for selecting between the first and second orifices responsive to the operating condition of the engine.

The means for causing a delay can further include a valve housing having respective valve openings interposed in the atmospheric pressure passage and the negative pressure passage, respectively and a changeover valve means for closing selectively either one of the valve openings. The first and second orifices can be provided in the valve housing in parallel with the respective valve openings. The changeover valve means can include a valve body having a through passage opening which corresponds to at least one of the valve openings. The through passage opening which corresponds to at least one of the valve openings. The through passage opening can be provided therein with the corresponding orifice.

The control valve can include a tubular valve housing and an inner tube therein forming an inlet side valve chamber between the housing and the inner tube. The inner tube can have therein an outlet side valve chamber and a valve body facing one end surface thereof.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
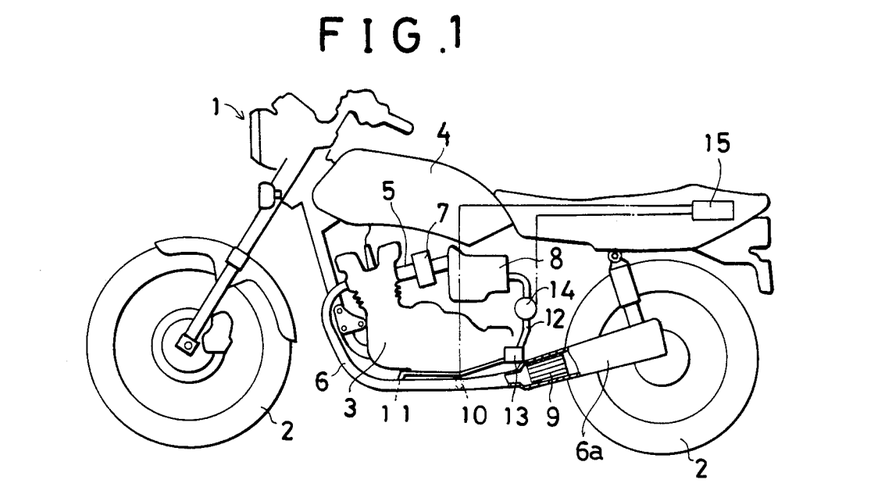
FIG. 1 is a side view of one embodiment of the present invention applied to a motorized two-wheeled vehicle.

One embodying example of this invention will now be explained with reference to the accompanying drawings:

Referring to the drawings, a vehicle body 1 is provided with front and rear wheels 2, 2, an internal combustion engine 3 in the middle thereof and a fuel tank 4 on the upper side thereof so as to constitute as a whole a motorized two-wheeled vehicle. The engine 3 is provided with at least one intake pipe 5 extending rearwards on the upper side and at least one exhaust pipe 6 extending rearwards on the lower side. The intake pipe 5 is provided with a carburetor 7 and an air cleaner 8. The carburetor 7 is so set as to supply a mixture of air and fuel of which an air-fuel ratio is a little on the rich side from a theoretical perfect air-fuel ratio.

Figure 2:
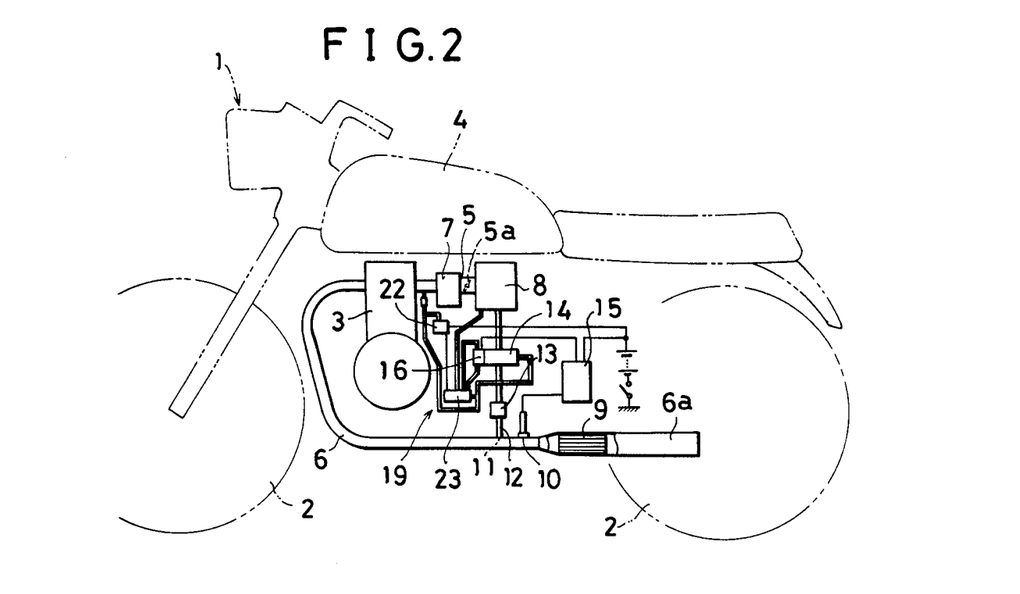
FIG. 2 is a principal diagrammatical side view of an important portion thereof.
Figure 3:
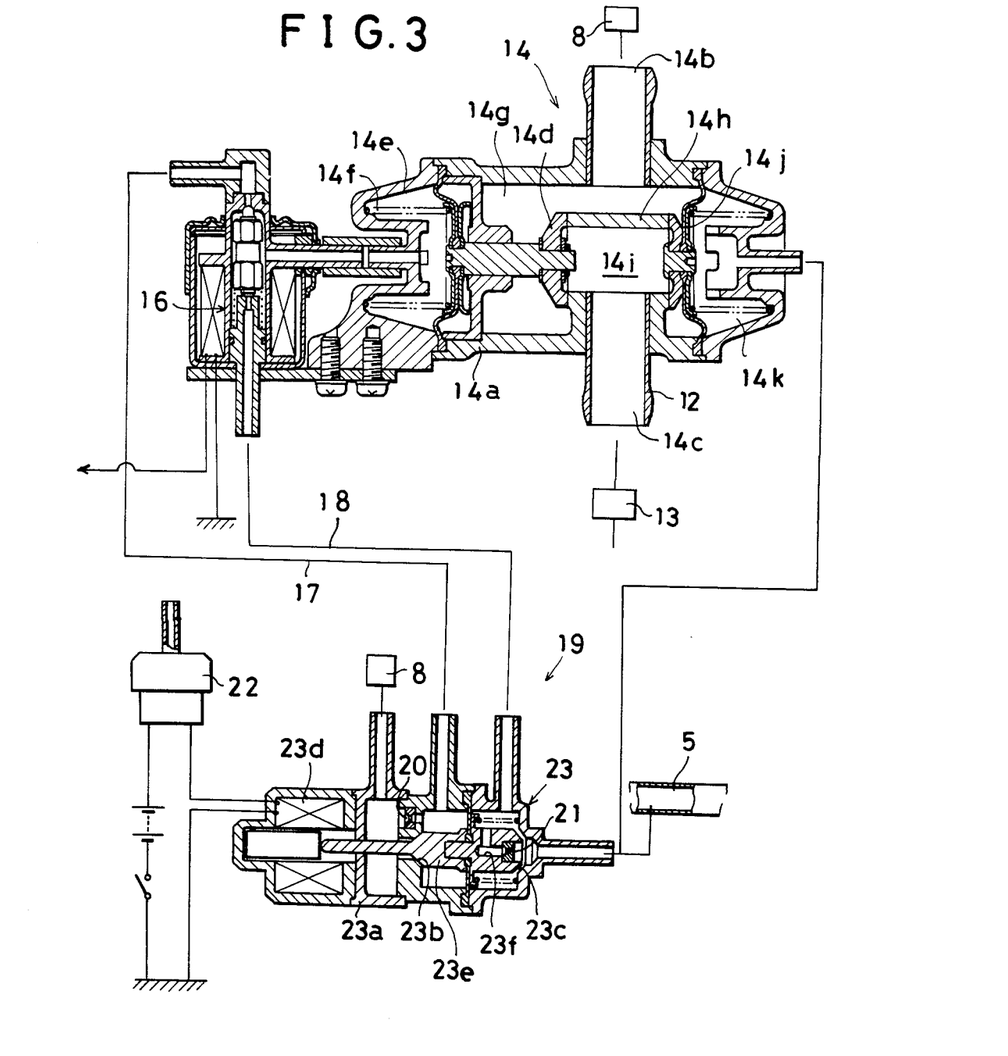
FIG. 3 is an enlarged sectional view of part of the important portion thereof.

As shown clearly in FIG. 2, the exhaust pipe 6 is provided on the downstream side thereof with a muffler 6a in which a three component catalytic type catalyzer 9 is contained for exhaust gas purification. On the upstream side of the catalyzer 9 is an exhaust gas sensor 10 such as an $O_2$ sensor or the like for detecting an air-fuel ratio of the exhaust gas. Further upstream side of the sensor 10 is a secondary air introducing opening 11. The opening 11 is in communication through an introducing passage 12 with the foregoing air cleaner 8, and has a reed valve 13 on its downstream side and a control valve 14 on its upstream side which are interposed therein so that the secondary air may be introduced into the exhaust pipe 6 through the reed valve 13 by the pulsation action of the exhaust gas and at the same time its introduction thereinto may be controlled by the control valve 14. The control valve 14 is controlled in its opening and closing operations by an output signal, that is, a rich signal or lean signal of the sensor 10, through a control circuit 15. The detailed arrangement of the control circuit 15 is, for instance, as shown in FIG. 3.

Namely, the control valve 14 is interposed in the introducing passage 12 having an inlet opening 14b and an outlet opening 14c made in a surrounding valve housing 14a. A valve body 14d provided inside the housing 14a is so arranged as to be responsive to pressure in a pressure chamber 14e formed on one side thereof, and be opened against the action of a spring 14f if the pressure is a negative one. The pressure chamber 14e is arranged to be selectively connected, by the action of an electromagnetic valve 16 which is responsive to the foregoing sensor 10, either to an atmospheric pressure passage 17 connected to the atmosphere through the air cleaner 8 or a negative pressure passage 18 into which an intake negative pressure in the foregoing intake pipe 5 is introduced. Further more in detail, if the sensor 10 detects a rich side of the air-fuel ratio, that is, a decrease in the concentration of $O_2$, of the exhaust gas in the exhaust pipe 6, the electromagnetic valve 16 is moved upwards to open the negative pressure passage 18 by an operation of the control circuit 15 caused by a rich signal. Consequently, the control valve 14 is acted by the negative pressure thereof and is opened for introducing the secondary air. If, on the other hand, the sensor 10 detects a lean signal of the air-fuel ratio, that is, an increase in the concentration of $O_2$, the electromagnetic valve 16 is moved downwards to open the atmospheric pressure passage 17 by an operation of the control circuit 22 caused by the lean signal thereof, and consequently the control valve 14 is closed by the action of the spring 14f and cuts off the introduction of the secondary air.

To sum up, the exhaust gas is given the introduction of the secondary air by the rich signal of the sensor 10, and the introduction of the secondary air thereinto is cut off by the lean signal. Thus, the air-fuel ratio of the exhaust gas is adjusted to become near the theoretical air-fuel ratio, but this is not always desirable as described before. According to this invention, there is provided a control means 19 by which the air-fuel ratio of the exhaust gas may be biased either towards the rich side of the lean side of the theoretical air-fuel ratio in accordance with an opening condition of the engine 3.

The control means 19 is constructed to cause a delay in opening or a delay in closing of the control valve 14 according to an operating condition of the engine 3. As a control means, an electric delay element for effecting the foregoing delays may be incorporated in the control circuit 15, but as shown in the illustrated example, there can be provided the control means 19 constructed such that the atmospheric pressure passage 17 and the negative pressure passage 18 are provided with respective orifices 20, 21 either of which is arranged to be selectively operated in accordance with an operating condition of the engine 3.

Furthermore, in detail, the control means 19 as a means for detecting an operating condition of the engine 3, comprises a negative pressure switch 22 responsive to an intake negative pressure of the intake pipe 5, that is, a switch 22 which is opened when a throttle valve 5a in the intake pipe only open a small amount. Accordingly, when the intake negative pressure is large the switch is closed when the throttle valve 5a is open a large amount. Accordingly, the intake negative pressure is small. A magnetic operated changeover valve 23 which is controlled to be energized or disenergized by the foregoing switch 22 is constructed such that a valve housing 23a thereof is provided therein with a rear valve opening 23b interposed in the atmospheric pressure passage 17, a front valve opening 23c interposed in the negative pressure passage 18 and an intermediate valve body 23e which is responsive to an operation solenoid 23d. The respective orifices 20, 21 are provided in parallel with the respective valve openings 23b, 23c, so that in the condition that the rear valve opening 23e, the orifice 20 in parallel therewith is selected to be interposed in the atmospheric pressure passage 17. In the condition that the front valve opening 23e is closed by an advance movement of the valve body 23e, the orifice 21 in parallel therewith is selected to be interposed in the negative pressure passage 18.

In the illustrated example, the valve body 23e is formed to have a through passage opening 23f facing the front valve opening 23c. The orifice 21 is provided in the passage opening 23f, so that a separate space for providing of the orifice 21 can be omitted and as a result the small-sized changeover valve 23 can be achieved.

Figure 8:
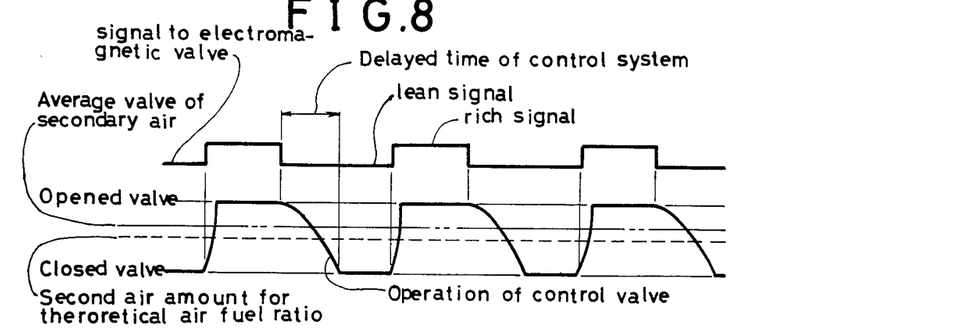
FIGS. 8 and 9 are diagrams for explanation of operations thereof.

Next, the operation of the foregoing apparatus will be explained as follows:

When the throttle valve 5a is only open a small amount and accordingly the intake negative pressure is large, that is, when the engine 3 is in its low load and low speed range, the negative pressure switch 22 is opened and the changeover valve 23 operates so that the valve body 23e thereof is retreated as illustrated. In this manner, the orifice 20 is selected to be interposed in the atmospheric pressure passage 17. If under the foregoing condition, the sensor 10 outputs a rich signal and a lean signal alternately, and the electromagnetic valve 16 selects the negative pressure passage 18 and the atmospheric pressure passage 17 alternately to open and close the control valve 14, a delay is caused by the orifice 20 in the operation for introducing the atmospheric pressure through the atmospheric pressure passage 17 by the rich signal, and accordingly, a delay in the closing operation of the control valve 14. Thus, the cycles of opening and closing of the control valve become as shown in FIG. 8, for instance. By this delay in closing, the amount of the secondary air introduced through the control valve 14 is decreased as a whole, and accordingly the air-fuel ratio of the exhaust gas becomes biased toward a lean side from the theoretical air-fuel ratio. The operation point of the catalyzer 9 is moved to the right in FIG. 10. In other words, the catalyzer operates on the side increased in the purification rate of HC and CO. This operation meets the characteristics of the exhaust gas when the engine is in its low load and low speed range. Namely, it meets the driving operation wherein generation of CO, HC is increased.

When the throttle valve 5a is open to a large degree and the intake negative pressure is small, that is, when the engine 3 is in its high load and high speed, range, the switch 22 is closed and the changeover switch 23 operates so that the valve body 23e thereof is advanced and thus, the orifice 21 is selected to be interposed in the negative pressure passage 18.

Figure 9:
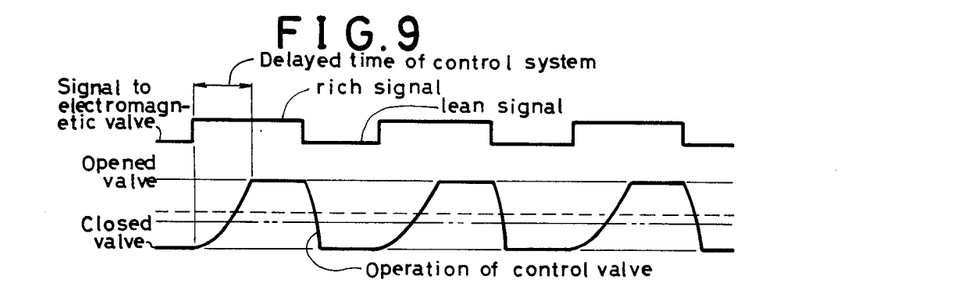

As a result, the cycles of opening and closing of the control valve 14 becomes as shown in FIG. 9. Namely, a delay is caused by orifices 21 in opening of the control valve 14, and the amount of the secondary air introduced therethrough is decreases as a whole. The exhaust gas is biased toward the rich side, and the operation point of the catalyzer 9 is moved to the left in FIG. 10. This is effective for increasing the purification rate of $NO_X$.

The above has been explained about the characteristic feature of the present invention. In the illustrated example, various contrivances as described below are applied thereto, from such a standpoint that the engine 3 is mounted on the motorized two-wheeled vehicle.

A first featured point thereof is such that, in order that the control valve 14 may be small-sized, a valve housing 14a of the control valve 14 is formed to be tubular as shown clearly in FIG. 3. An inner tube 14h is so constructed having an inlet side valve chamber 14g connected to the inlet opening 14b. An outlet side valve chamber 14i connected to the outlet opening 14c is formed within the inner tube 14h. The valve body 14d is so disposed as to face one end surface of the inner tube 14h, so that the control valve 14 can be formed into a comparatively small tubular one. In this case, control valve 14 is additionally provided with a second valve body 14j facing the other end surface of the inner tube 14h and a second pressure chamber 14k on the outside of the second valve body 14j, so that the second pressure chamber 14k may be always supplied with the intake negative pressure. In this manner, on the occasion of a rapid deceleration or the like, the secondary valve body 14j may be opened to supply the secondary air therethrough. Thus, the foregoing construction of the control valve 14 is advantageous for provision of such a secondary valve body 14j, as above.

The second featured point thereof is such that, as shown in FIG. 1, the secondary air introducing passage 12 is so provided as to be located to the rear of the engine 3 and to extend upwards and downwards between the air cleaner 8 on the upper side and the exhaust pipe 6 on the lower side so that the introducing passage 12 may be shortened in length and may not occupy a large space for providing thereof. Additionally, the inlet opening 14b and the outlet opening 14c of the control valve 14 are made in the upper side and the lower side of the valve housing 14a, and the control valve 14 is interposed, at its inlet opening 14b and its outlet opening 14c, in the vertically extending introducing passage 12. Consequently, a comparatively compact arrangement thereof can be achieved.

A third featured point thereof is such that the control valve 14 is so provided that the movement direction of the valve body 14d thereof is the same as the vehicle width direction of the motorized two-wheeled vehicle and thereby any wrong operation of the valve 14 which otherwise would be caused by forward and rearward movements of the vehicle may not be caused.

A fourth featured point thereof is directed to attaching of the exhaust gas sensor 10. It is desirable that the sensor 10 is attacted to a place which is not only protected from external foreign matters but also comparatively constant in temperature. For this purpose, in the illustrated example, as shown in FIGS. 4 to 7, the sensor 10 mounted at its one end portion in the exhaust pipe 6 is provided at its outer end portion with a protection cover 24 surrounding the same, and the protection cover 10 is attached to a bottom surface of the engine 3, that is, a bottom surface which is an oil pan 3b formed on the bottom portion of a crankcase 3a of the engine 3, for instance, by means of screws 25 or the like. Thus, the sensor 10 can be protected by the cover 24 from any external foregoing matters such as small stones, muddy water or the like and additionally can be kept good in operation because the same is applied with a comparatively stable temperature of the bottom portion of the engine 3 to be always in a substantially constant temperature condition.

A fifth featured point thereof is such that the engine is composed of a multiple cylinder one having four cylinders 26 as shown clearly in FIG. 4, and in order that the control valve 14 and the exhaust gas sensor 10 may be used in common to all the cylinders 26, such an arrangement as described below is designed. Namely, in the illustrated example, the exhaust pipe 6 is formed with four exhaust pipes 6 each being connected to each exhaust port 26a of each cylinder 26. The four exhaust pipes are divided into two groups extending respectively on one lateral side and on the other lateral side of the engine 3. The two exhaust pipes 6, 6, of each group further so extend rearwards as to pass by the bottom of the engine 3 and are connected to their single common muffler 6a on each side. Each exhaust passage extending between each exhaust port 26a of each cylinder 26 to each muffler 6a is provided at its exhaust port 26a portion on the most upstream end thereof or at an upstream portion of the exhaust pipe 6 connected thereto with each secondary air introducing opening 11, and the respective introducing passages 12 connected to the respective introducing openings 11 are joined together to be connected, through the reed valve 13 located on the upstream side thereof, to their single common control valve 14. Additionally, there is provided a single common sensor 10 at the joining portion 6b of the two exhaust pipes 6, 6 on each side so that the average concentration of the exhaust gases from the two respective cylinders 26 on each side may be representatively detected at the joining portion 6b, and the control by the single common control valve 14 can be carried out.

The intake pipe 5 is formed with four pipes each connected to each intake port 26b of each cylinder 26, and each thereof is provided with each carburetor 7.

Even in any case where the engine 3 is of the type one that has three cylinders or five or more cylinders, the single common sensor 10 may be provided at a joining portion 6b of at least two exhaust pipes 6, 6 on one side or two.

Figure 4:
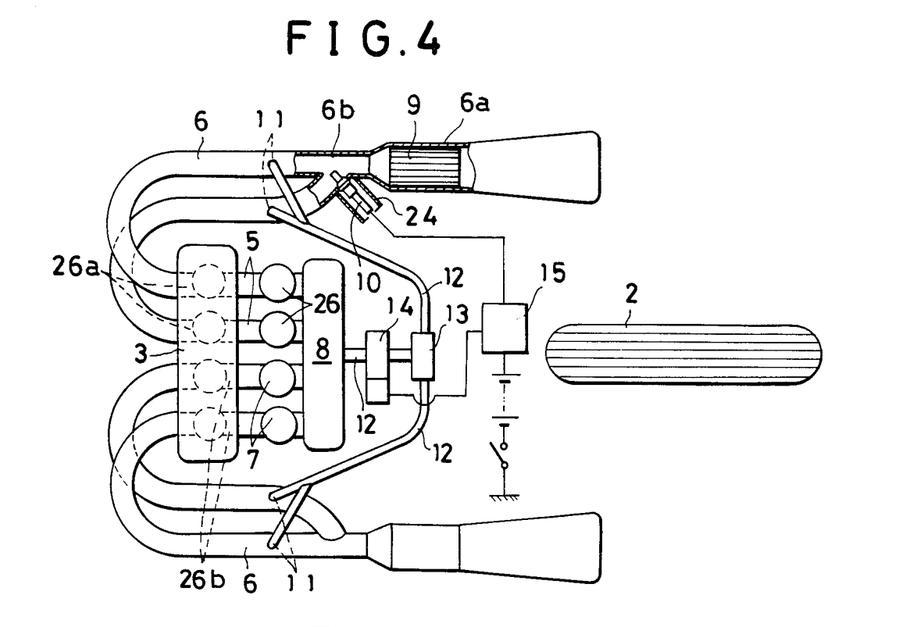
FIG. 4 is a systematic diagram of an intake and exhaust system thereof.
Figure 5:
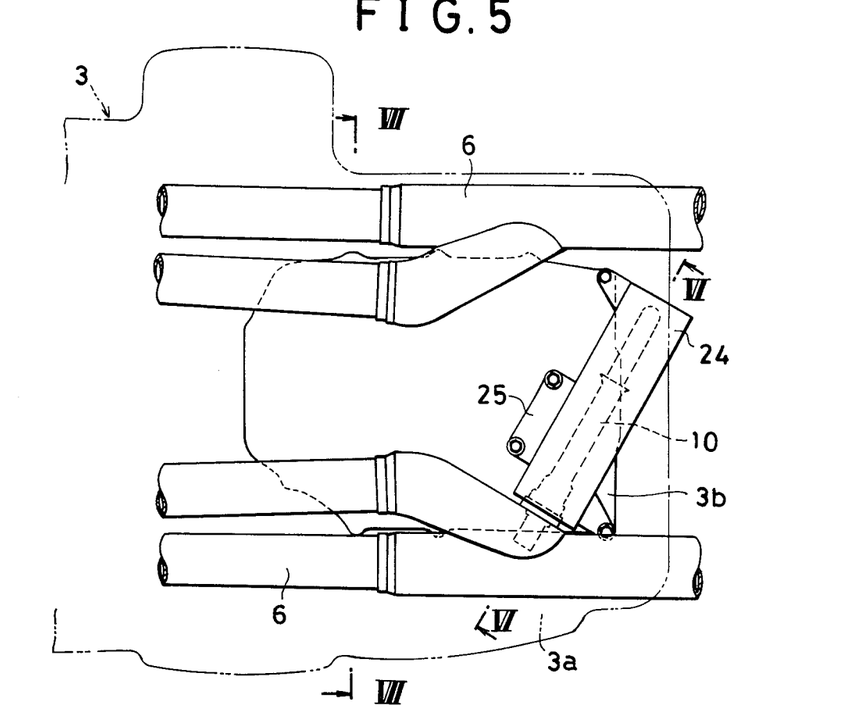
FIG. 5 is a bottom plan view of part thereof as viewed from a bottom side of the engine.
Figure 6:
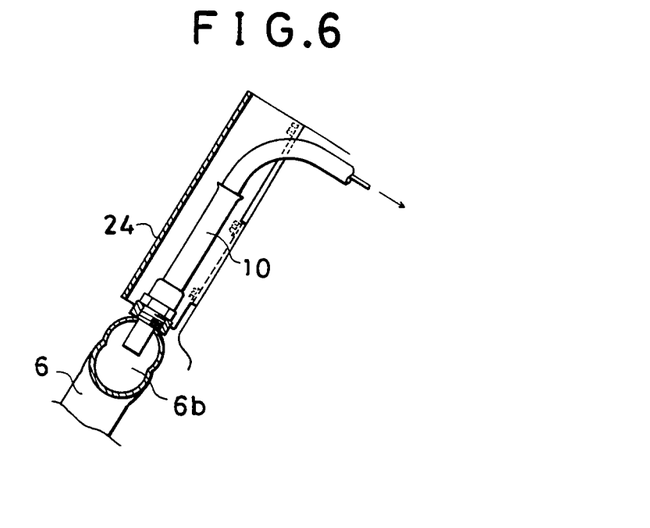
FIGS. 6 and 7 are sectional views taken respectively along the lines VI—VI and VII—VII in FIG. 5.
Figure 7:
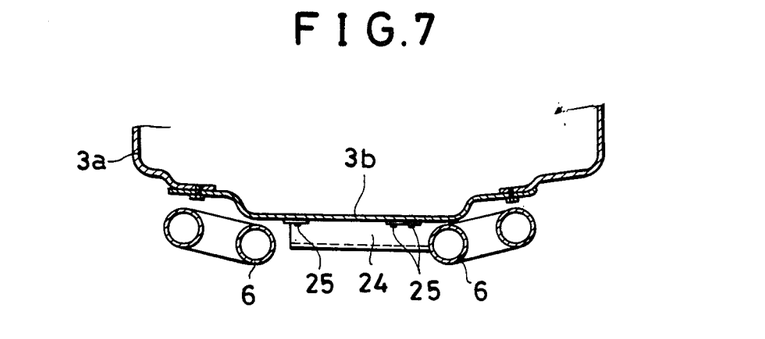

For simplification, the control means 19 is omitted in FIGS. 1 and 4.

Thus, an apparatus according to this invention is so arranged that an air-fuel ratio of an exhaust gas may be biased inclined towards the rich side or the lean side from the theoretical air-fuel ratio in accordance with change in an operating condition of the engine, so that the apparatus can operate in compliance with a change in composition of the exhaust gas components caused by the operating condition, and a purification efficiency thereof can be improved.

It is readily apparent that the above-described exhaust gas purification apparatus meets all of the objects mentioned abpve and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An exhaust gas purification apparatus in an internal combustion engine wherein an exhaust passage of an internal combustion engine is provided with a catalyzer for three components of an exhaust gas, an exhaust gas sensor, and a secondary air introducing opening so that the exhaust gas which is to be fed to the catalyst may be controlled to have a predetermined air-fuel ratio by introducing secondary air through the introducing opening in accordance with an output signal of the sensor; the apparatus further comprising an atompheric pressure passage, a negative pressure passage, and control means for biasing the air-fuel ratio of the exhaust gas away from the theoretical perfect air-fuel ratio in accordance with an operating condition of the engine; said control means including a control valve having a pressure chamber, said control valve being arranged to be controlled to open and close according to the output signal of the sensor and being interposed in the secondary air introducing passage connected to the introducing opening, an electromagnetic valve means having inlet means connected to said atomspheric pressure passage and said negative pressure passage and outlet means connected to said pressure chamber, said electromagnetic valve means being responsive to said output signal of said sensor, and means for causing a delay in movement of the control valve in accordance with the operating condition of the engine; and means for causing a delay including a first orifice in said negative pressure passage, a second orifice in said atmospheric pressure passage, and means for selecting between said first and second orifices responsive to the operating condition of the engine.

2. An exhaust gas purification apparatus in an internal combustion engine wherein an exhaust passage of an internal combustion engine is provided with a catalyst for three components of an exhaust gas, an exhaust gas sensor, and a secondary air introducing opening so that the exhaust gas which is to be fed to the catalyzer may be controlled to have a predetermined air-fuel ratio by introducing secondary air through the introducing opening in accordance with an output signal of the sensor, the apparatus further comprising control means for biasing the air-fuel ratio of the exhaust gas away from the theoretical perfect air-fuel ratio in accordance with an operating condition of the engine; said control means including a control valve arranged to be controlled to open and close according to the output signal of the sensor and interposed in the secondary air introducing passage connected to the introducing opening, and means for causing a delay in movement of the control valve in accordance with the operating condition of the engine; said control valve including a tubular valve housing, and an inner tube therein forming an inlet side valve chamber between the housing and the inner tube, the inner tube having therein an outlet side valve chamber and a valve body facing one end surface thereof.

3. An exhaust gas purification apparatus of claim 1, wherein the means for causing a delay further includes a valve housing having respective valve openings interposed in the atmospheric pressure passage and the negative pressure passage, respectively, and a changeover valve means for closing selectively either one of the valve openings in accordance with the operating condition of the engine; and wherein the first and second orifices are provided in the valve housing in parallel with the respective valve openings.

4. An exhaust gas purification apparatus of claim 3 wherein changeover valve means includes a valve body having a through passage opening which corresponds to at least one of the valve openings and the through passage opening is provided therein with the corresponding orifice.

5. An exhaust gas purification apparatus of claim 1 wherein the control valve includes a tubular valve housing, and an inner tube therein forming an inlet side valve chamber between the housing and the inner tube, the inner tube having therein an outlet side valve chamber and a valve body facing one end surface thereof.

6. An exhaust gas purification apparatus of claim 2 wherein the engine is mounted on a middle portion of a vehicle body of a motorized two-wheeled vehicle, and is provided with at least one intake pipe located on the upper side and extending rearwardly therefrom and at least one exhaust pipe constituting the exhaust passage located on the lower side and extending rearwardly therefrom.

7. An exhaust gas purification apparatus of claim 1 wherein the engine is mounted on a middle portion of a vehicle body of a motorized two-wheeled vehicle, and is provided with at least one intake pipe located on the upper side and extending rearwardly therefrom and at least one exhaust pipe constituting the exhaust passage located on the lower side and extending rearwardly therefrom.

8. An exhaust gas purification apparatus of claim 6, wherein the introducing passage is located in the rear of the engine as to extend upwards and downwards between an air cleaner connected to the rear end of the intake pipe and the exhaust pipe located below the air cleaner, and the control valve is interposed in the introducing passage with an inlet opening thereof facing upwardly and an outlet opening made in said tubular valve housing thereof facing downwardly.

9. An exhaust gas purification apparatus of claim 7, wherein the introducing passage is located in the rear of the engine as to extend upwards and downwards between an air cleaner connected to the rear end of the intake pipe and the exhaust pipe located below the air cleaner, and the control valve is interposed in the introducing passage with an inlet opening thereof facing upwardly an outlet opening made in said tubular valve housing thereof facing downwardly.

10. An exhaust gas purification apparatus of claim 8, wherein the control valve is positioned such that the moving direction of a valve body thereof is the same as a lateral axis of the motorized two-wheeled vehicle.

11. An exhaust gas purification apparatus of claim 9, wherein the control valve is positioned such that the moving direction of a valve body thereof is the same as a lateral axis of the motorized two-wheeled vehicle.

12. An exhaust gas purification apparatus of claim 6, wherein the sensor mounted at its one end portion in the exhaust pipe is provided at its outer portion with a protection cover surrounding the same, and the cover is attached to a bottom surface of the engine.

13. An exhaust gas purification apparatus of claim 7, wherein the sensor mounted at its one end portion in the exhaust pipe is provided at its outer portion with a protection cover surrounding the same, and the cover is attached to a bottom surface of the engine.

14. An exhaust gas purification apparatus of claim 6, wherein the engine is a multiple cylinder engine comprising at least three cylinders, and each cylinder is provided with the intake pipe and the exhaust pipe which are connected respectively to an intake port and an exhaust port thereof, the introducing opening being made in the exhaust port portion or the exhaust pipe of each cylinder, and the respective introducing passages connected to the respective introducing openings being joined together to have on an upstream side the control valve as a single common valve, the exhaust pipes being distributed on one lateral side and on the other lateral side of the engine, at least two exhaust pipes on one side being joined together to form a joining portion thereof, and the sensor being provided at the joining portion for serving as a single common sensor.

15. An exhaust gas purification apparatus of claim 7, wherein the engine is a multiple cylinder engine comprising at least three cylinders, and each cylinder is provided with the intake pipe and the exhaust pipe which are connected respectively to an intake port and an exhaust port thereof, the introducing opening being made in a portion of the exhaust pipe of each cylinder, and the respective introducing passages connected to the respective introducing openings being joined together to have on upstream side the control valve as a single common valve, the exhaust pipes being distributed on one lateral side and on the other lateral side of the engine, at least two exhaust pipes on one side being joined together to form a joining portion thereof, and the sensor being provided at the joining portion for serving as a single common sensor.

* * * * *